(12) United States Patent
Fasen

(10) Patent No.: US 8,059,361 B2
(45) Date of Patent: Nov. 15, 2011

(54) POSITION SIGNAL PROCESSOR

(75) Inventor: Donald Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 12/352,468

(22) Filed: Jan. 12, 2009

(65) Prior Publication Data

US 2010/0177434 A1 Jul. 15, 2010

(51) Int. Cl.
*G11B 5/584* (2006.01)
(52) U.S. Cl. .................................. 360/77.12
(58) Field of Classification Search .............. None
See application file for complete search history.

(56) References Cited

U.S. PATENT DOCUMENTS

| | | | |
|---|---|---|---|
| 5,930,065 A * | 7/1999 | Albrecht et al. ........... | 360/77.12 |
| 6,111,719 A | 8/2000 | Fasen | |
| 6,563,659 B1 | 5/2003 | Fasen | |
| 6,879,457 B2 * | 4/2005 | Eaton et al. ..................... | 360/75 |
| 6,940,683 B2 * | 9/2005 | Berman et al. ............. | 360/77.12 |
| 7,245,450 B1 * | 7/2007 | Cherubini et al. ......... | 360/73.12 |
| 7,369,342 B2 * | 5/2008 | Bui et al. ................... | 360/77.12 |
| 7,443,623 B2 * | 10/2008 | Bui et al. ................... | 360/77.12 |
| 7,480,114 B2 * | 1/2009 | Cherubini et al. ......... | 360/73.12 |
| 7,639,448 B2 * | 12/2009 | Haustein et al. ........... | 360/77.12 |
| 7,679,858 B2 * | 3/2010 | Winarski et al. ........... | 360/77.12 |
| 7,724,466 B2 * | 5/2010 | Bui et al. .................... | 360/77.12 |
| 7,903,360 B2 * | 3/2011 | Cherubini et al. .............. | 360/75 |
| 2006/0245104 A1 | 11/2006 | Bui | |
| 2009/0161249 A1 * | 6/2009 | Takayama et al. ......... | 360/77.12 |
| 2010/0177433 A1 | 7/2010 | Fasen | |

OTHER PUBLICATIONS

U.S. Appl. No. 12/352,434, Non-Final Rejection dated Apr. 15, 2011, pp. 1-5 and attachment.

* cited by examiner

*Primary Examiner* — Hoa T Nguyen
*Assistant Examiner* — James L Habermehl

(57) ABSTRACT

In one embodiment a tape drive system comprises a reel adapted to engage a tape cartridge, the tape cartridge comprising a tape media having a servo code written along a length of the tape media, a tape head comprising at least one servo element to detect the servo code, a drive assembly to induce relative motion between the tape and the tape drive, a servo system to control the lateral and longitudinal motion between the tape and the tape head, the servo system comprising a sampling module to sample servo data from the tape media, and a position signal processor to calculate a position signal using the servo data from the sampling module, wherein the position signal processor calculates a position signal based on each adjacent servo element set.

25 Claims, 9 Drawing Sheets

POSITION SIGNAL PROCESSOR

BACKGROUND

Many magnetic tape storage systems implement a recording technology referred to as "linear recording" technology. Linear recording tape systems record information in multiple parallel tracks that extend in the direction of the length of the tape. Most, linear recording systems use one or more tape heads operating on tape that is driven past the tape head at a controlled speed. The tape head may employ multiple read/write elements that can operate simultaneously on the tape.

Continuing advances in magnetic storage technology provide for constantly increasing data storage densities. The more tracks that can be fit across the width of a tape, the more information that can be stored on a tape. Thus, there is a push to increase the number of tracks across the width of a tape and to reduce the width of each track. Increasing the number of tracks or reducing the width of a track makes accurate positioning of read/write elements, and issues of tape wander more important.

Servo control systems employ information or patterns recorded along a track of the tape to accurately position read/write elements relative to data on the tape. Servo patterns on a tape may include a characteristic that changes across the width of the tape. The servo information may be used to accurately position heads relative to the length of the tape (e.g., when searching for a desired position along the length of the tape, such as the start of a file) as well as relative to the width of the tape (i.e., lateral position). Thus, as a servo element passes over the servo track, lateral position can be determined.

Some servo control systems implement a sampling routine to collect position information from the servo patterns on a tape. In some respects, the accuracy of the sampling routine limits the storage density that can be implemented on the tape. Thus, improved sampling routines may find utility.

DETAILED DESCRIPTION

Figure 1:
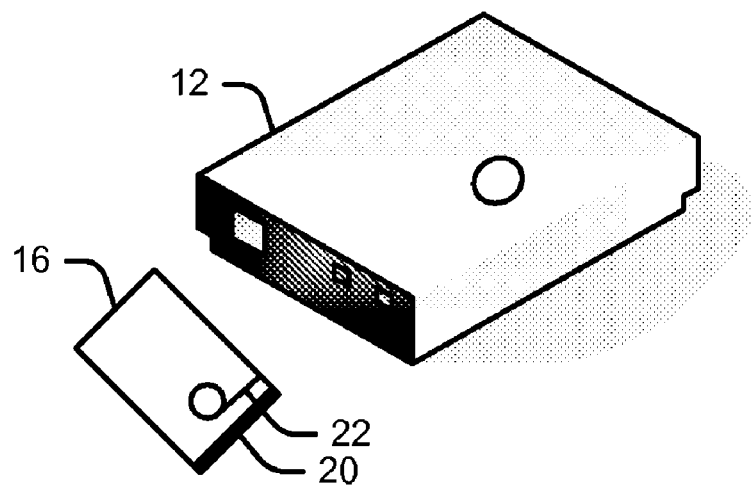
FIG. 1 is a schematic illustration of a data storage device in which a position signal processor may be implemented, according to embodiments.
Figure 2:
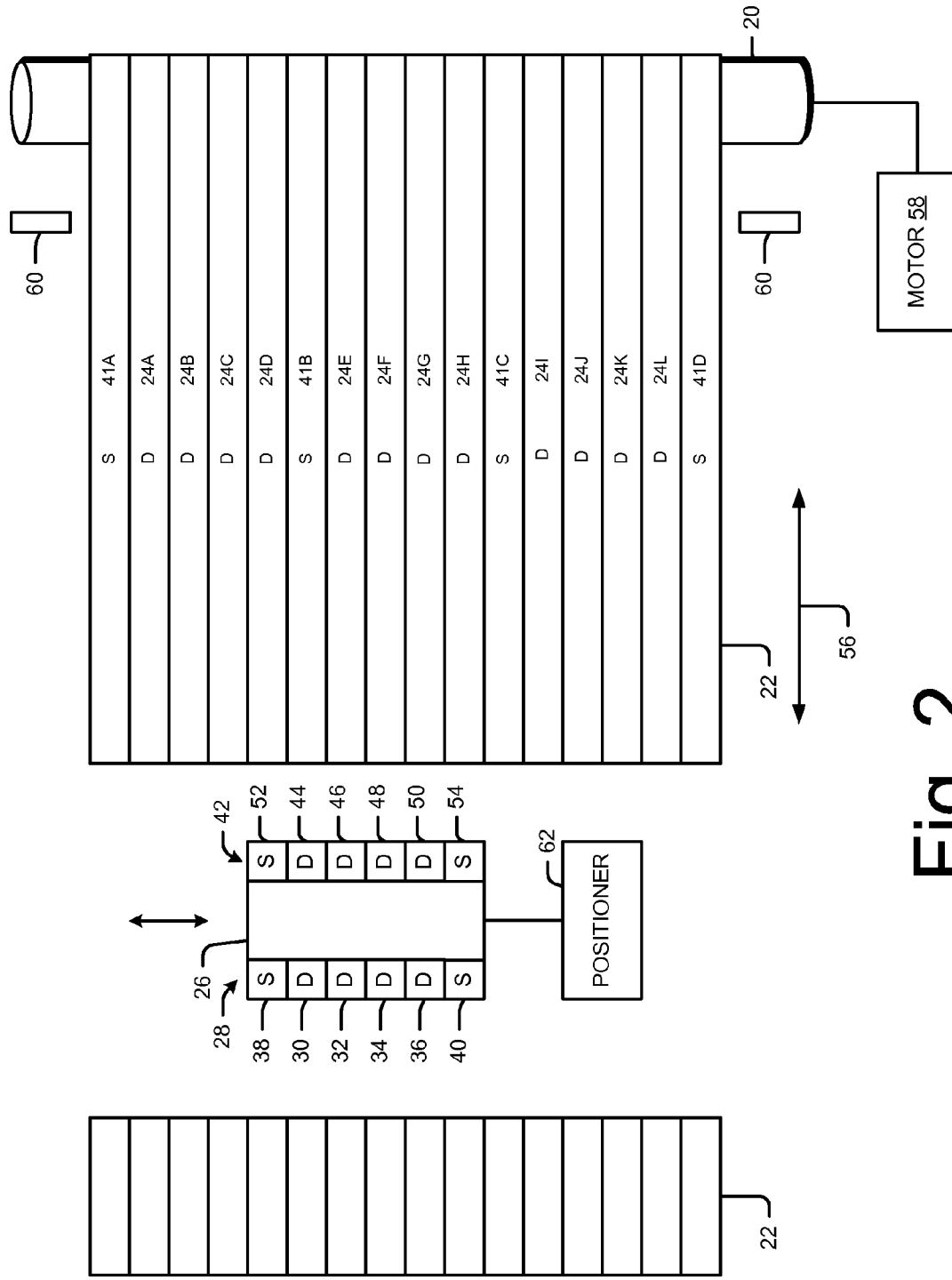
FIG. 2 is schematic illustration of an arrangement of servo elements and read/write elements on a head in a data storage device, and illustrating an arrangement of data tracks and servo bands on a magnetic recording medium on which the head operates.

FIG. 1 is a schematic illustration of a data storage device in which a position signal processor may be implemented, according to embodiments. FIG. 2 is schematic illustration of an arrangement of servo elements and read/write elements on a head in a data storage device, and illustrating an arrangement of data tracks and servo bands on a magnetic recording medium on which the head operates. Referring first to FIG. 1, data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10. In the illustrated embodiment, the data storage device 12 is a linear recording tape drive. Although the invention is illustrated as being employed in a computer data storing tape drive system in FIG. 1, the invention has a wide variety of applications. For example, some aspects of the invention can be used in connection with other storage media, for storing either analog or digital information. Some aspects of the invention can be embodied, for example, in connection with any of a variety of types of storage devices, including disk storage devices. For purposes of illustration, the invention will be described in connection with a computer tape drive.

Referring to FIG. 1 and FIG. 2, the tape drive 12 is used with tape cartridges 16. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. In the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, and 24L (24A-L) are defined across the width of the tape 22. The tracks 24A-L extend in the direction of the length of the tape 22.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, and 41D different from the data tracks 24. In the illustrated embodiment, the servo code is pre-written to the parallel bands 41A, 41B, 41C, and 41D by another servo writer that may or may not be included in the tape drive 12.

In FIG. 2, three sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, and 41D by another servo writer that may or may not be included in the tape drive 12.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor (drives the other of the reels 18 or 20. In an alternative embodiment, a capstan drives the tape. The tape drive 12 may include conventional components such as tapes guides 60.

In one embodiment, the servo and read/write elements of the second bump 42 are respectively parallel to the servo and read/write elements of the first bump 28, as shown in FIG. 2.

Figure 3:
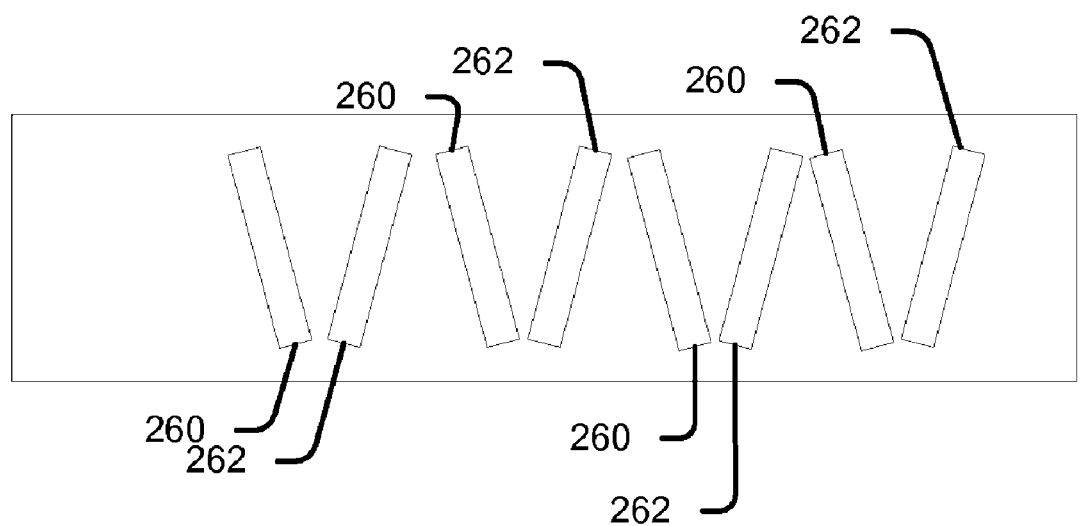
FIG. 3 is a schematic illustration of a servo band included in the magnetic recording medium shown in FIG. 2.

FIG. 3 illustrates a servo band configuration that could be employed in one embodiment of the invention for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

Figure 4:
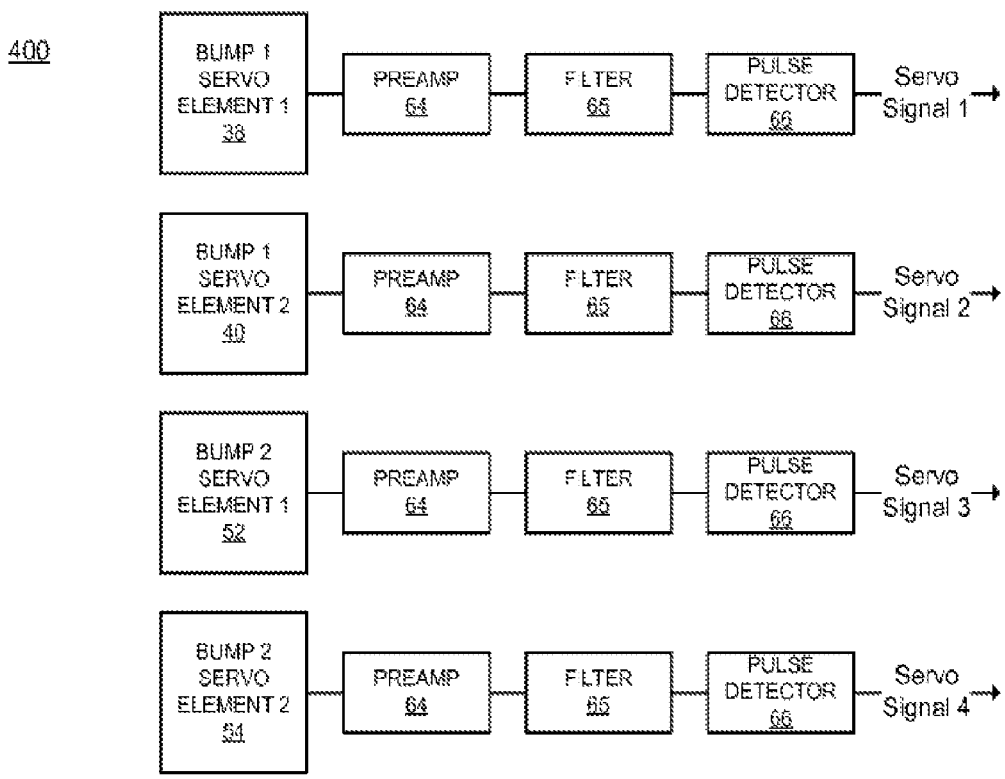
FIG. 4-5 are block diagrams that provide schematic illustrations of a servo system including the servo read elements of FIG. 2.
Figure 5:
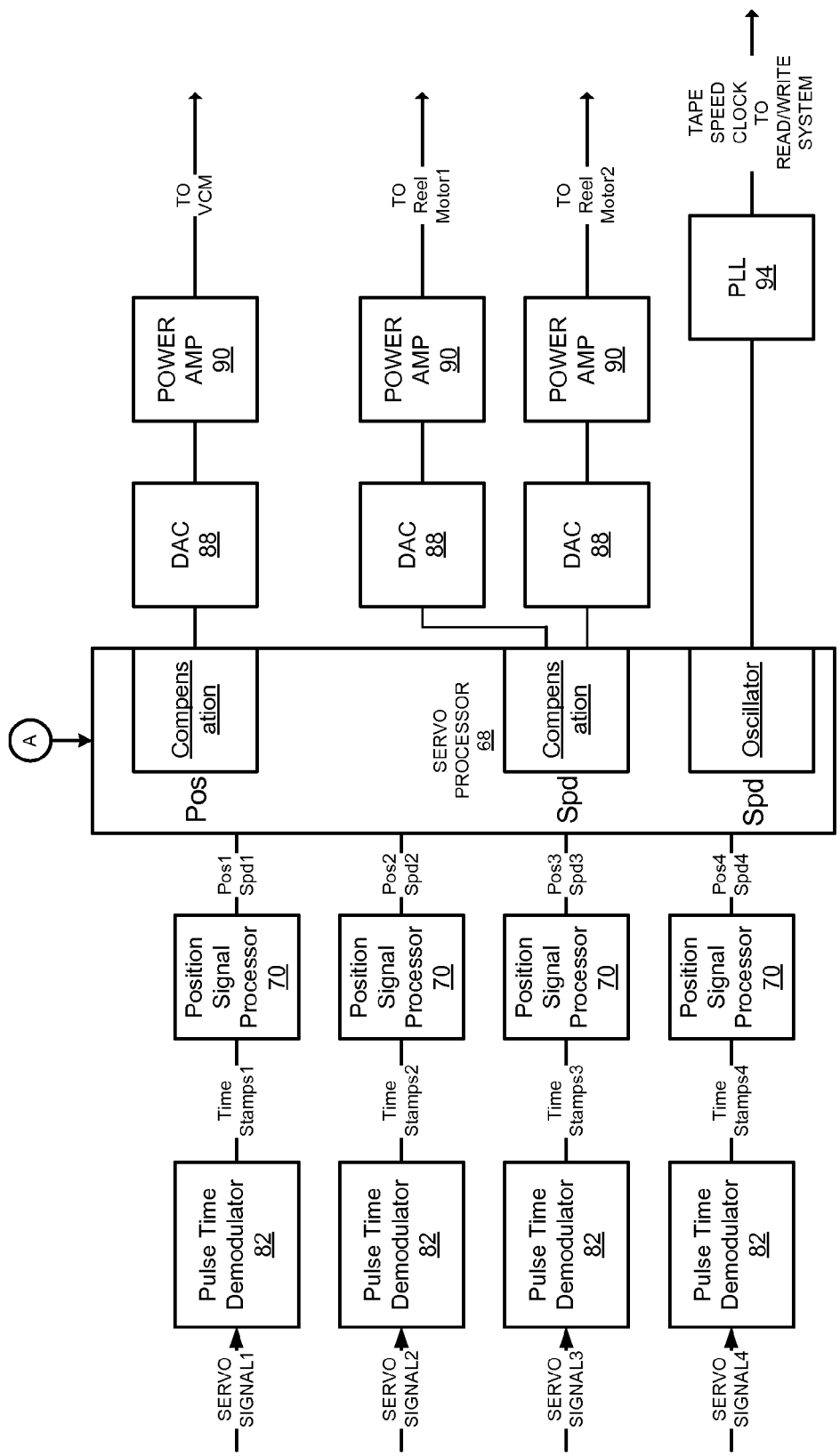

FIG. 4-5 are block diagrams that provide schematic illustrations of a servo system including the servo elements of FIG. 2. Referring first to FIG. 4, which is a schematic illustration of a sampling circuit assembly 400 to detect servo elements on the tape and to generate a servo signal from the servo elements, the tape drive 12 includes preamps 64 respectively coupled to the servo elements 38, 40, 52, and 54, and amplifying servo signals read by the servo elements which are reading servo code. This may be either the elements 38 and 40, or the elements 52 and 54, depending on the direction of tape travel, as described above. The signals from the preamps 64 are input to respective filters 65, the outputs of which are input to respective pulse detectors 66. The pulse detectors 66 generate respective servo signals (i.e., Servo Signal 1, Servo Signal 2, Servo Signal 3, Servo Signal 4). In some embodiments, the pulse detectors 66 generate a binary, digital signal when the output of the filters 65 hits an inflection point (see FIG. 8).

FIG. 5 is a schematic illustration of a position control circuit assembly 500, according to embodiments. In some embodiments, the position control circuit assembly 500 processes the servo signals generated by the pulse detectors 66 to generate position and speed signals, which in turn may be used to position the head 26 relative to the tape 22. Referring now to FIG. 5, the circuit assembly 500 includes pulse time demodulators 82 which receive timing signals "SERVO SIGNAL1", "SERVO SIGNAL2" "SERVO SIGNAL3 and "SERVO SIGNAL4 produced by the pulse detectors 66. The pulse time demodulators 82 associate time stamps with the servo signals, which are input to a position signal processor 70. In some embodiments, the pulse time demodulators 82 also determine differences in time stamps produced by the timing demodulators 82, referred to herein as delta time signals. These delta time signals are also passed to the position signal processor 70. The position signal processors generate respective position error signals POS1,POS2, POS3, and POS4 and speed signals SPD1, SPD2, SPD3, and SPD4, which are passed to the servo processor 68.

The servo processor 68 uses the signals from the position signal processors 70 to position the head 26 over the tracks from which the read/write elements are reading or to which the read/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor.

Figure 8:
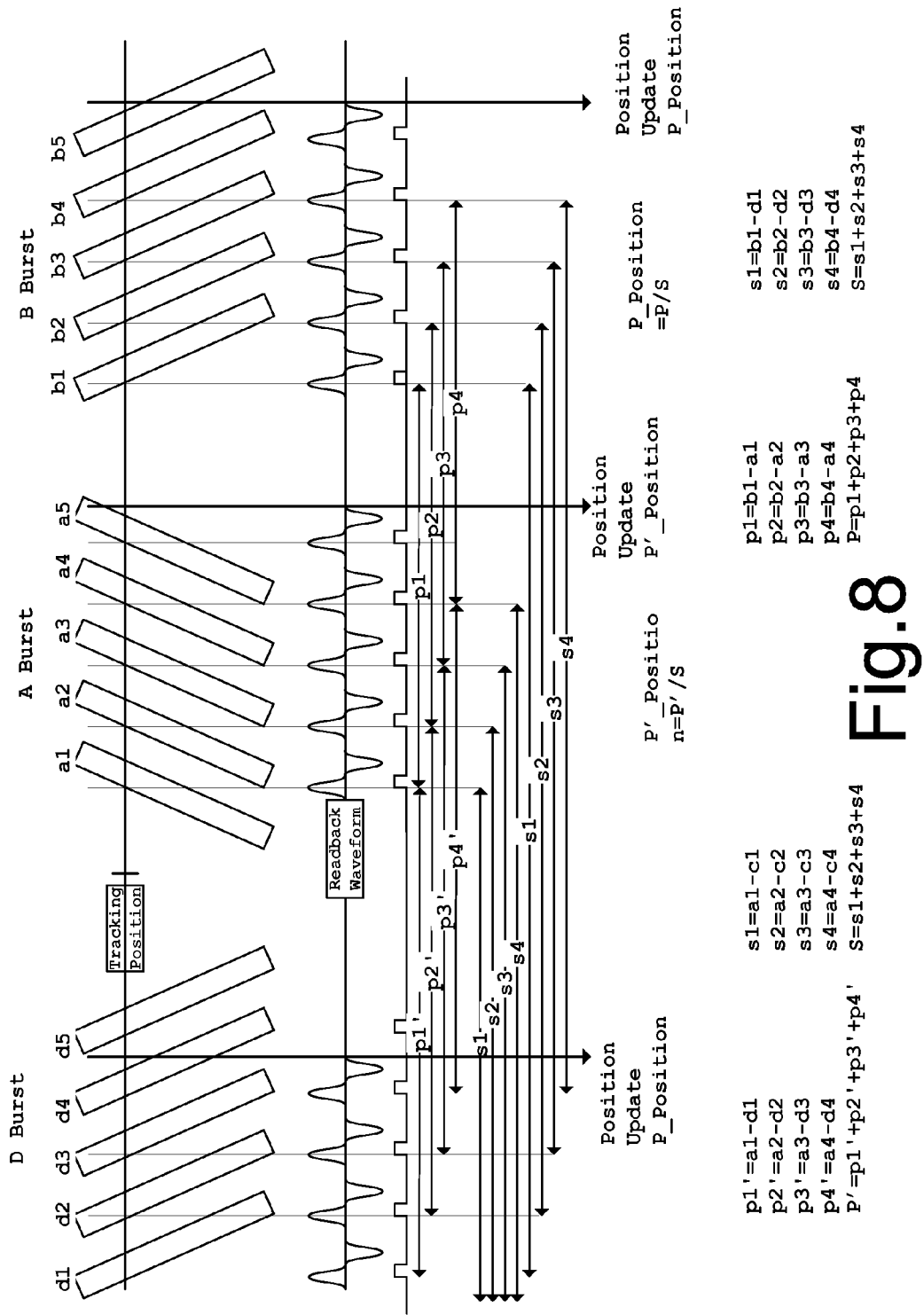
FIG. 8 is a schematic illustration of a sampling process which may be implemented by sampling module, according to embodiments.

In some embodiments, a tape drive system as described herein may implement techniques to extract timing information from both the positive and negative peaks shown in FIG. 8. The position signal processor (70) processes the time stamps from the servo data from the tape media in a manner that enables the use of both positive pulses and negative pulses to generate the position (Pos) and Speed (Spd) signals used for head position and reel motor feedback control loops. For example, the Position Signal Processors may combine time-stamps from both the positive pulses generated by the servo code on the tape, and may use these time-stamps to generate position and/or speed data, which in turn may be provided to the positioner 62 to adjust the position of the read head(s) relative to the tape.

Figure 6:
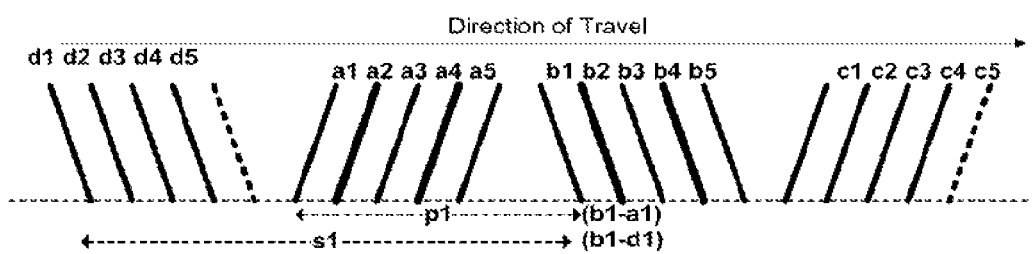
FIG. 6 is a schematic illustration of a servo code pattern which may be used by a position signal processor, according to embodiments.

One embodiment of a time measurement and position signal processor will be explained with reference to FIGS. 6-9. Referring first to FIG. 6, in one embodiment a tape servo code pattern may comprise alternating sets of servo codes, also referred to as stripes patterned along the longitudinal axis of the tape. In the embodiment depicted in FIG. 6, the servo code comprises a repeating pattern of four sets of stripes, each of which comprises five stripes. In some embodiments, a position signal processor calculates a position signal as a ratio of a P/S measurement, where P represents a time measurement between reading the first stripe in a set and the first stripe in the next set. Thus, in the embodiment depicted in FIG. 6, the measurement p1 represents the time which elapses between detecting the stripe b1 and detecting the stripe a1. In addition, the measurement s1 represents the time which elapses between detecting the stripe b1 and detecting the stripe d1. Note that this measurement assumes that the tape travels in the direction indicated by the arrow in FIG. 6, relative to the read head. In the event that the tape is travels in the opposite direction the order of subtraction would be reversed.

In practice, the time differences between pulses of adjacent stripe bursts are accumulated to create an average signal. Thus, in FIG. 1, p1=b1−a1, p2=b2−a2, p3=b3−a3, p4=b4−a4, and an accumulated signal P may be calculated as P=p1+p2+ p3+p4. Similarly, the s time differences between pulses of alternate stripe bursts are accumulated to create the average S signal. In FIG. 1, s1=b1−d1, s2=b2−d2, s3=b3−d3, s4=b4−d4 and an accumulated signal S may be calculated as S=s1+s2+ s3+s4. This embodiment assumes that information is gathered from only the first four of the five strips in each pattern. One skilled in the art will recognize that the fifth stripe in each set could also be included in the calculations.

Figure 7:
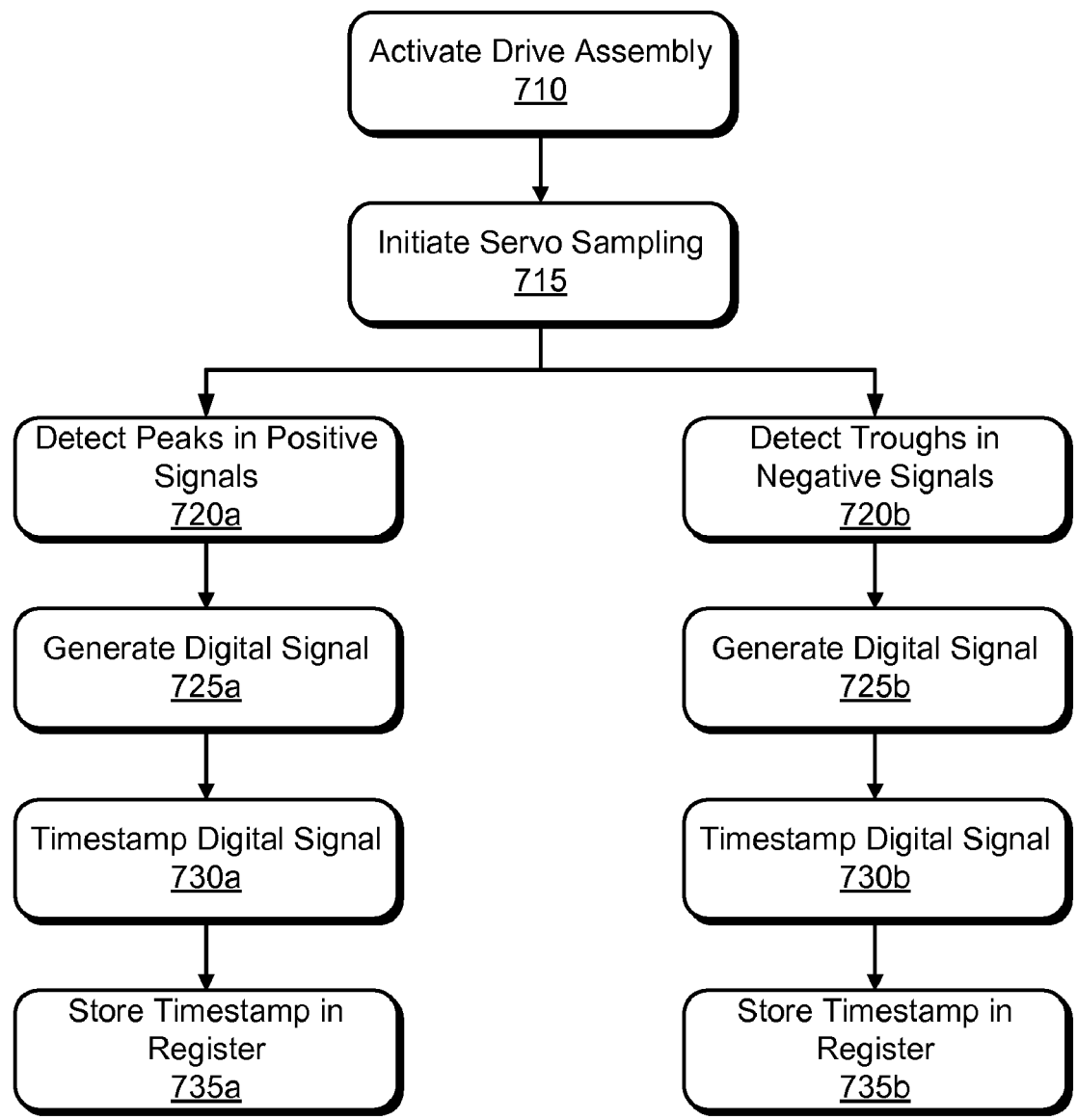
FIG. 7 is a flowchart illustrating operations in a method implemented by sampling module 69, according to embodiments.

Aspects of a sampling process will be explained with reference to FIGS. 7-8. Referring now to FIG. 7, at operation 710 the drive assembly is activated to initiate movement of the tape relative to the tape head, and at operation 715 time measurement of the servo code is initiated, e.g., by activating the pulse time demodulator module(s) 82. Referring to FIG. 8, each servo stripe generates a readback waveform in the tape head of the system. In the embodiment depicted in FIG. 8, the leading edge of each stripe generates a positive readback waveform which peaks at the leading edge of the stripe, while the lagging edge of each stripe defines a peak in a negative readback waveform. The pulse detector 66 detects (operation 720*a*) the peaks in the positive readback waveforms generated by the stripes and generates a digital pulse (operation 725*a*) in response to the positive peaks. Similarly, the pulse time detector 66 detects (operation 720*b*) the peaks in the negative readback waveforms generated by the stripes and generates a digital pulse (operation 725*b*) in response to the negative peaks. Thus, as illustrated in FIG. 8, the pulse detector 66 generates a series of digital pulses which reflect the positive peaks and a separate series of pulses which reflect the negative peaks.

Figure 9:
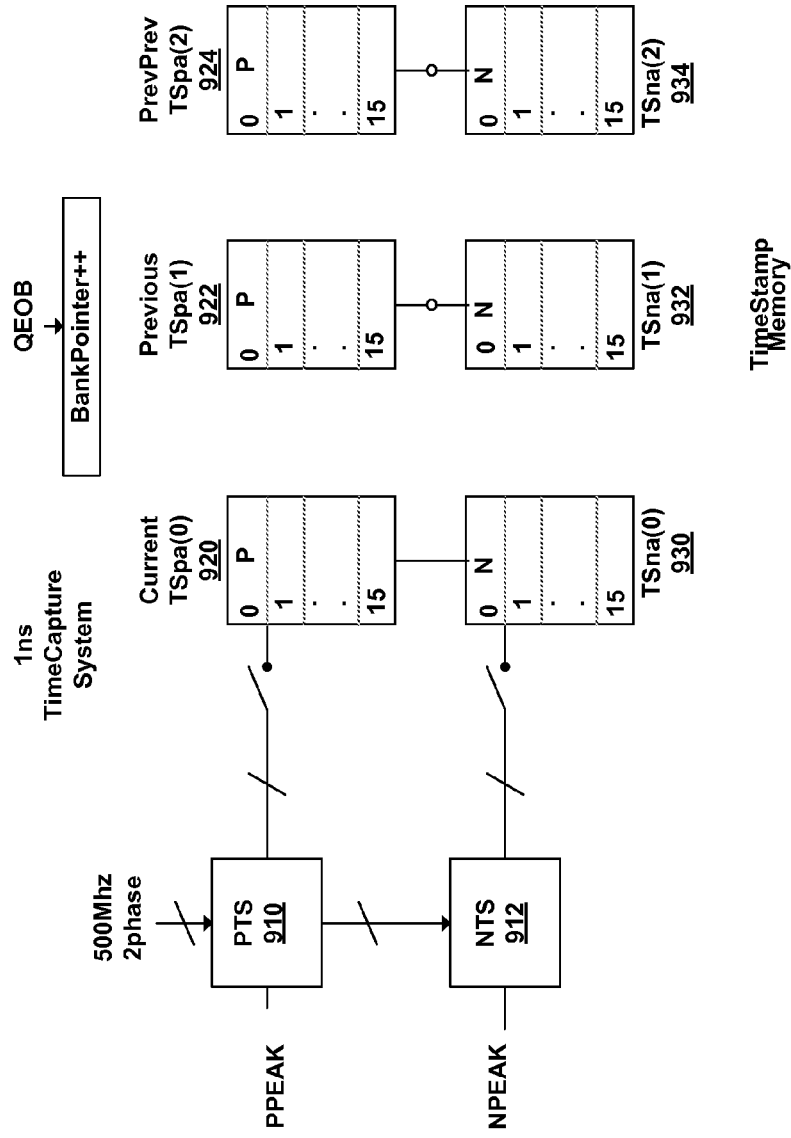
FIG. 9 is a schematic illustration of an architecture for sampling data for a position signal processor, according to embodiments.

FIG. 9 is a schematic illustration of an architecture for sampling data for a position signal processor, according to embodiments. Referring now to FIG. 9, digital pulse streams from the sampling module are input to a register structure 900. A timestamp is applied to the positive peaks in positive timestamp module 910 (operation 730*a*), and a timestamp is applied to the negative peaks in a negative timestamp module 912 (operation 730*b*). The timestamps are then stored in a register array (operation 735*a*, 735*b*). In the embodiment depicted in FIG. 9, the positive timestamp module 910 is gated to an array of registers 920, 922, 924. Similarly, the negative timestamp module 912 is gated to an array of registers 930, 932, 934.

Figure 10:
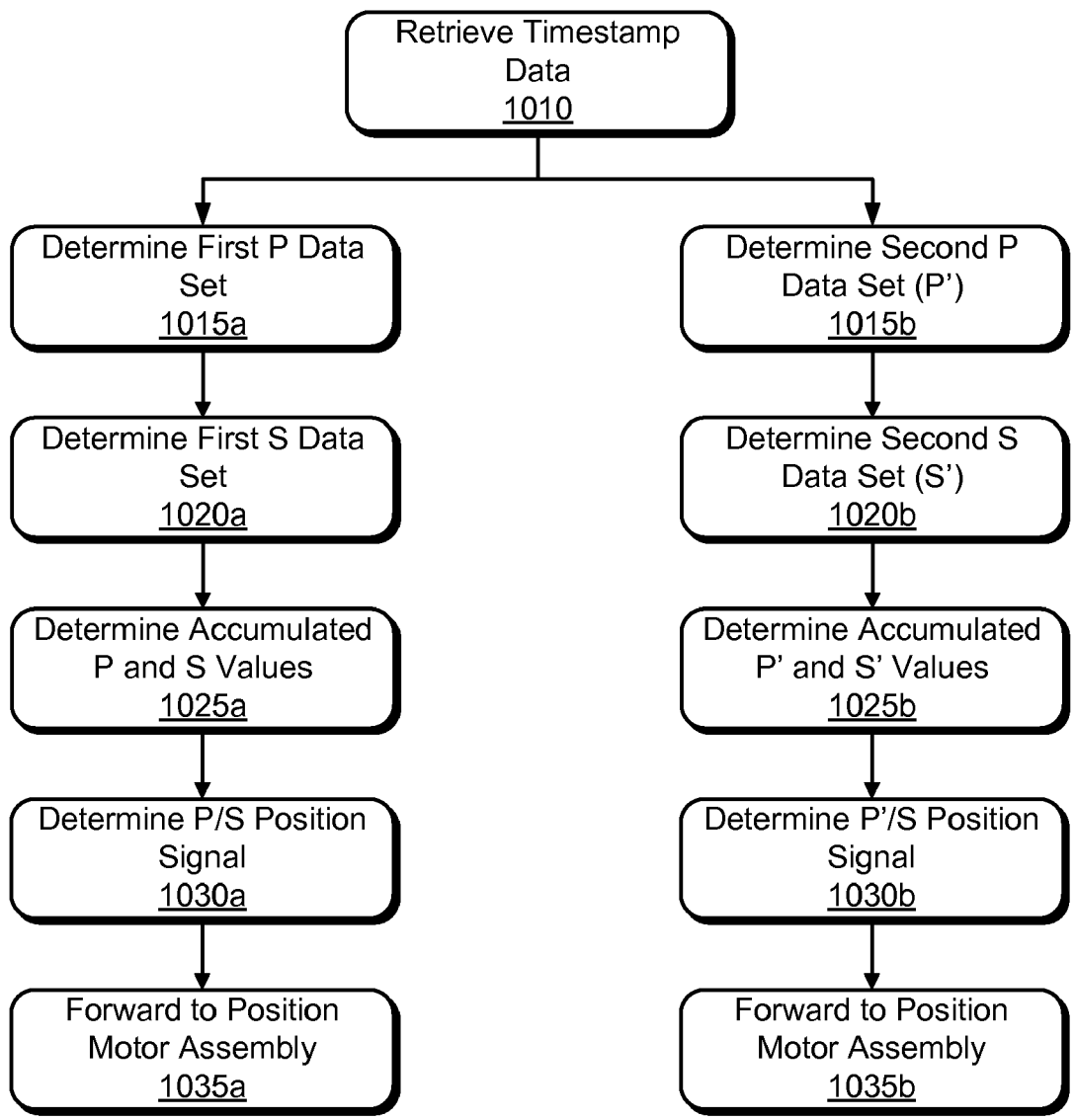
FIG. 10 is a flowchart illustrating operations in a method implemented by a position signal processor, according to embodiments.

The stored timestamps may be retrieved from memory and used by the position signal processor 70 to calculate a position signal. FIG. 10 is a flowchart illustrating operations in a method implemented by a position signal processor, according to embodiments. Referring to FIG. 10, at operation 1010 the timestamp data is retrieved from the registers in which it was stored.

At operation 1015*a* the position signal processor 70 determines a first P data set from the retrieved data. Referring to FIG. 8, the first P data set corresponds to the differences in the timestamps between corresponding stripes in the "A burst" and the "B burst" (i.e., p1, p2, p3, p4). At operation 1020*a* the position signal processor 70 determines a first S data set from the retrieved data. Referring to FIG. 8, the first S data set corresponds to the differences in the timestamps between corresponding stripes in the "A burst and the "C burst" (i.e., s1, s2, s3, s4). Referring briefly to FIG. 6, one skilled in the art will understand that these data sets may also be calculated between the each adjacent servo element set for all or any portion of the adjacent servo elements on the tape.

At operation 1025 the position signal processor 70 determines accumulated P and S values. Referring to FIG. 8, in one embodiment the accumulated P value P=p1+p2+p3+p4 and the accumulated S value S=s1+s2+s3+s4. At operation 1030*a* the position signal processor determines a position signal by dividing the accumulate P signal by the accumulated S signal. At operation 1035*a* this position signal is forwarded to a position motor assembly. For example, in the embodiment depicted in FIG. 5 the position signal is forwarded to the digital to analog converter (DAC) 88, then to an amplifier 90 and to a voice control motor, which uses the signal to position the read head relative to the tape.

The position signal processor 70 performs analogous operations on the data collected from the servo elements in the "D burst" and the "A burst." Thus, at operation 1015*b* the position signal processor 70 determines a second P data set (referred to as a P' data set) from the retrieved data. Referring to FIG. 8, the P' data set corresponds to the differences in the timestamps between corresponding stripes in the "D burst" and the "A burst" (i.e., p'1, p'2, p'3, p'4). At operation 1020*b* the position signal processor 70 determines a second S data set from the retrieved data. Referring to FIG. 8, the second S data set corresponds to the differences in the timestamps between corresponding stripes in the "D burst and the "B burst" (i.e., s1, s2, s3, s4). Referring briefly to FIG. 6, one skilled in the art will understand that these data sets may also be calculated between the each adjacent servo element set for all or any portion of the adjacent servo elements on the tape.

At operation 1025*b* the position signal processor 70 determines accumulated P' and S values. Referring to FIG. 8, in one embodiment the accumulated P value P'=p'1+p'2+p'3+p'4 and the accumulated S value S=s1+s2+s3+s4. At operation 1030*b* the position signal processor determines a position signal by dividing the accumulated P' signal by the accumulated S signal. At operation 1035*b* this position signal is forwarded to a position motor assembly. For example, in the embodiment depicted in FIG. 5 the position signal is forwarded to the digital to analog converter (DAC) 88, then to an amplifier 90 and to a voice control motor, which uses the signal to position the read head relative to the tape.

Because the slope of the stripes used for the P' processing (D-A and C-B) is the inverse of the P stripes, the position signal sign must be inverted. Also, the P' value is largest at the top of the servo pattern while the P value is smallest. To address these issues, in some embodiments the position signal processor 70 calculates a correction for the P' position signal, as follows:

$$Corrected\_P' = Kreg - P',$$

where Kreg is nominally 1.

In some embodiments, the servo pattern write process may introduce variations in the distance between the D-A and B-C stripe bursts. To compensate for this shift, an offset correction term the Kreg may be adjusted to maintain the Corrected_P' position relative to the P position value.

Figure 11:
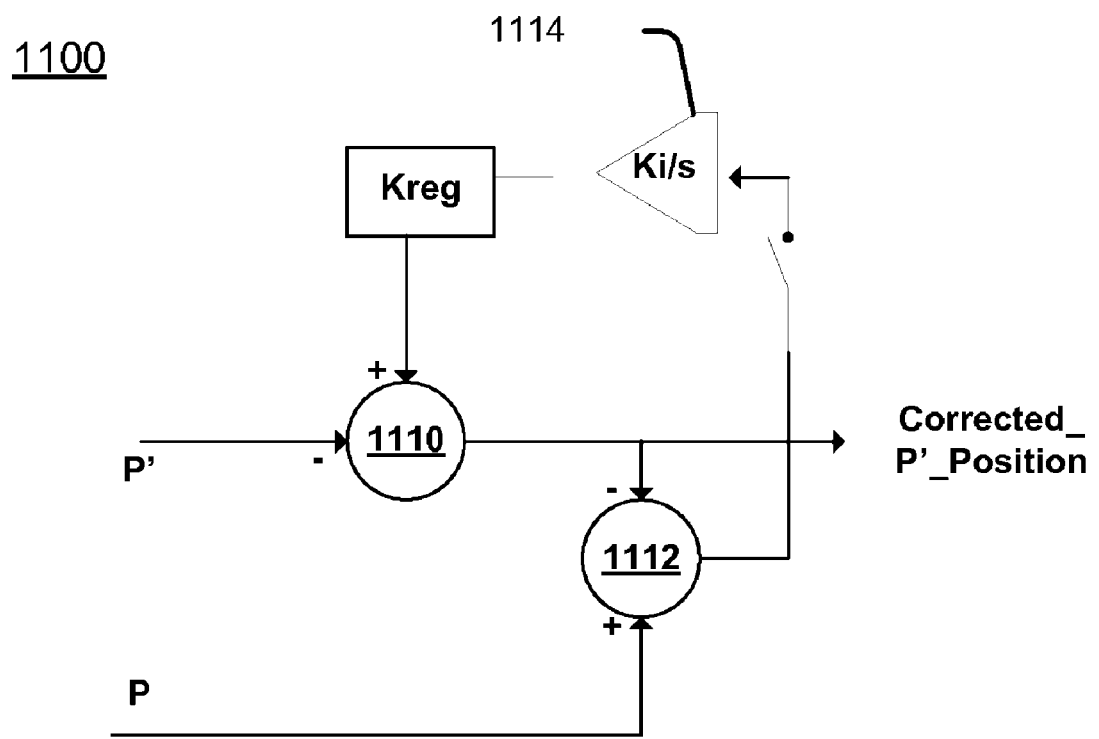
FIG. 11 is a schematic illustration of a circuit arrangement, according to embodiments.

FIG. 11 is a schematic illustration of a circuit arrangement for adjusting the correction Kreg so the average difference between the P_Position and the Corrected_P'_Position is zero. Referring to FIG. 11, the P signal and the P' signal are input to the circuit arrangement 1100. The P' signal and the Kreg value are input to a summer 1110. The P signal and the output of the summer 1110 are input to a second summer 1112. The output of summer 1112 is input to an integrator 1114, with a gain of Ki. The integrator gain adjusts the frequency of written-in speed variation corrected with Kreg. The output of the integrator 1114 is input to the Kreg, which in turn is input to the summer 1110. The output of summer 110 represents the corrected P' position signal.

In operation the operations and structures depicted herein permit the system to generate digital data samples representative of both positive and negative waveforms generated by the servo pattern on the tape. The position signal processor 70 may compute a position signal from the data samples, which in turn may be provided as input to a motor assembly to induce relative motion between the tape head and the tape. Thus, the operations and structures depicted herein form part of a feedback loop to control the positioning of the tape head relative to the tape.

The methods described herein may be embodied as logic instructions on a computer-readable medium. When executed on a processor, the logic instructions cause a computer device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A tape drive system, comprising:
   a reel adapted to engage a tape cartridge, the tape cartridge comprising a tape media having a servo code written along a length of the tape media;
   a tape head comprising at least one servo element to detect the servo code;
   a drive assembly to induce relative motion between the tape media and the tape head;
   a servo system to control the relative motion between the tape media and the tape head, the servo system comprising:
      a sampling module to sample servo data from the tape media; and
      a position signal processor to calculate a position signal using the servo data from the sampling module, wherein the position signal processor is to calculate the position signal by:
         determining a first P data set based on differences between peaks in positive readback waveforms generated from a first set of servo stripe pairs in the servo code;
         determining a second P data set based on differences between peaks in positive readback waveforms generated from a second set of servo stripe pairs, adjacent the first set of servo stripe pairs in the servo code;
         adjusting data points in the second P data set using a correction value to form an adjusted second P data set; and
         determining an accumulated P value from the first P data set and the adjusted second P data set.

2. The tape drive system of claim 1, wherein the sampling module is to:
   detect the peaks in the positive readback waveforms;
   generate digital signals in response to the peaks;
   associate timestamps with the digital signals; and
   store the timestamps in a register.

3. The tape drive system of claim 2, wherein the sampling module is to further:
   detect second peaks in the negative readback waveforms;
   generate second digital signals in response to the second peaks;
   associate second timestamps with the second digital signals; and
   store the second timestamps in a register.

4. The tape drive system of claim 1, wherein the position signal processor is to further:
   determine a first S data set based on differences between peaks in positive readback waveforms generated from a third set of servo stripe pairs in the servo code;
   determine a second S data set based on differences between peaks in positive readback waveforms generated from a fourth set of servo stripe pairs, adjacent the third set of servo stripe pairs; and
   determine an accumulated S value from the first S data set and the second S data set.

5. The tape drive system of claim 4, wherein the position signal processor is to determine the position signal from the accumulated P data value and the accumulated S data value.

6. The tape drive system of claim 5, wherein the tape drive system further comprises a motor assembly to position the tape head relative to the tape media, and wherein the position signal processor is to provide the position signal to the motor assembly.

7. The tape drive system of claim 1, wherein the position signal processor is to further:
   compute the correction value for each P data point in the second P data set; and
   add the correction value to each P data point in the second P data set to perform the adjusting.

8. The tape drive system of claim 7, wherein:
   the correction value corresponds to a nominal constant value minus a P data point in the second P data set.

9. The tape drive system of claim 8, further comprising:
   an integrator circuit module to adjust the nominal constant value to compensate for variations in a distance between adjacent sets of servo stripes.

10. The tape drive system of claim 1, wherein the correction value is to correct for differences in distances between servo stripes due to slopes of servo stripes in the first and second sets of servo stripe pairs.

11. A method to adjust the position of a tape head relative to a tape in a tape drive, comprising:
sampling servo data from the tape;
calculating a position signal, comprising:
  determining a first measurement data set based on differences between readback waveforms generated from a first set of servo stripes on the tape;
  determining a second measurement data set based on differences between readback waveforms generated from a second set of servo stripes, adjacent the first set of servo stripes;
  adjusting values in the second measurement data set using a correction value to form an adjusted second measurement data set; and
  determining a first accumulated measurement value from the first measurement data set and adjusted second measurement data set; and
positioning the tape head relative to the tape in response to the position signal.

12. The method of claim 11, wherein sampling the servo data comprises:
detecting peaks in positive readback waveforms generated by servo stripes on the tape;
generating digital signals in response to the peaks;
associating timestamps with the digital signals; and
storing the timestamps in a register.

13. The method of claim 12, wherein sampling the servo data further comprises:
detecting second peaks in negative readback waveforms generated by servo stripes on the tape;
generating second digital signals in response to the second peaks;
associating second timestamps with the second digital signals; and
storing the second timestamps in a register.

14. The method of claim 11,
wherein the first measurement data set is a first P data set based on differences between peaks in positive readback waveforms generated from the first set of servo stripes, the first set of servo stripes comprising a first set of servo stripe pairs;
wherein the second measurement data set is a second P data set based on differences between peaks in positive readback waveforms generated from the second set of servo stripes, the second set of servo stripes comprising a second set of servo stripe pairs; and
wherein the accumulated measurement value is an accumulated P value determined from the first P data set and the second P data set.

15. The method of claim 14, further comprising:
determining a first S data set based on differences between peaks in positive readback waveforms generated from a third set of servo stripe pairs on the tape;
determining a second S data set based on differences between peaks in positive readback waveforms generated from a fourth set of servo stripe pairs, adjacent the third set of servo stripe pairs; and
determining an accumulated S value from the first S data set and the second S data set.

16. The method of claim 15, further comprising determining the position signal from the accumulated P data set and the accumulated S data set.

17. The method of claim 11, further comprising:
computing the correction value for each data point in the second measurement data set;
adding the correction value to each data point in the second measurement data set to perform the adjusting.

18. The method of claim 17, wherein:
the correction value corresponds to a nominal constant value minus a data point in the second measurement data set.

19. The method of claim 18, further comprising:
adjusting the nominal constant value to compensate for variations in a distance between adjacent sets of servo stripes.

20. The method of claim 11, wherein the position signal is based on the first accumulated measurement value.

21. The method of claim 11, wherein calculating the position signal further comprises:
determining a third measurement data set based on differences between readback waveforms generated from a third set of servo stripes on the tape;
determining a fourth measurement data set based on differences between respective readback waveforms generated from a fourth set of servo stripes;
determining a second accumulated measurement value from the third and fourth measurement data sets,
wherein the position signal is based on the first and second accumulated measurement values.

22. The method of claim 11, wherein the correction value is to correct for differences in distances between servo stripes due to slopes of servo stripes in the first and second sets of servo stripes.

23. The method of claim 22, wherein the first set of servo stripes is a first set of servo stripe pairs, and the second set of servo stripes is a second set of servo stripe pairs.

24. A tape drive system, comprising:
a reel adapted to engage a tape cartridge, the tape cartridge comprising a tape media having a servo code written along a length of the tape media;
a tape head comprising at least one servo element to detect the servo code;
a servo system to control relative motion between the tape media and the tape head, the servo system comprising:
  a sampling module to sample servo data from the tape media; and
  a position signal processor to calculate a position signal using the servo data from the sampling module, wherein the position signal processor is to calculate the position signal by:
    determining a first measurement data set based on differences between readback waveforms generated from a first set of servo stripes in the servo code;
    determining a second measurement data set based on differences between readback waveforms generated from a second set of servo stripes, adjacent the first set of servo stripes in the servo code;
    adjusting values in the second measurement data set using a correction value to form an adjusted second measurement data set; and
    determining an accumulated measurement value from the first measurement data set and the adjusted second measurement data set, wherein the position signal is based on the accumulated measurement value.

25. The tape drive system of claim 24, wherein the correction value is to correct for differences in distances between servo stripes due to slopes of servo stripes in the first and second sets of servo stripes.

* * * * *